United States Patent
Mahajan et al.

(10) Patent No.: US 6,236,982 B1
(45) Date of Patent: May 22, 2001

(54) SYSTEM AND METHOD FOR DISCOVERING CALENDRIC ASSOCIATION RULES

(75) Inventors: Sameer Mahajan, Beaverton, OR (US); Sridhar Ramaswamy, Scotch Plains; Abraham Silberschatz, Summit, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/152,770

(22) Filed: Sep. 14, 1998

(51) Int. Cl.$^7$ ....................................................... G06F 17/00
(52) U.S. Cl. ................................. 706/45; 706/47; 707/100
(58) Field of Search ................................. 706/45, 46, 47; 707/6, 100, 102, 200, 1, 104

(56) References Cited

U.S. PATENT DOCUMENTS

| | | | |
|---|---|---|---|
| 5,615,341 | * 3/1997 | Agrawal et al. | 705/10 |
| 5,668,988 | * 9/1997 | Chen et al. | 707/101 |
| 5,742,811 | * 4/1998 | Agrawal et al. | 707/6 |
| 5,752,020 | * 5/1998 | Ando | 707/4 |
| 5,842,200 | * 11/1998 | Agarwal et al. | 707/1 |
| 5,884,305 | * 3/1999 | Kleingerg et al. | 707/6 |
| 5,920,855 | * 6/1999 | Aggarwal et al. | 707/3 |
| 5,943,667 | * 8/1999 | Aggarwal et al. | 707/3 |
| 5,946,683 | * 8/1999 | Rastogi et al. | 707/6 |
| 5,983,222 | * 11/1999 | Morimoto et al. | 707/6 |
| 6,003,029 | * 12/1999 | Agarwal et al. | 707/7 |
| 6,078,955 | * 6/2000 | Konno et al. | 709/224 |
| 6,094,645 | * 7/2000 | Aggarwal et al. | 706/47 |

OTHER PUBLICATIONS

Agarwal et al, "Mining association rules between sets of items in large databases", ACM SIGMOD pp 207–216, May 1993.*

Klemettinen et al, "Finding intresting rules form large sets of discovered association rules", ACM CIKM pp 401–407, Mar. 1994.*

Park et al, "Efficient parallel data mining for association rules", AC< CIKM pp 31–36, Jun. 1995.*

(List continued on next page.)

*Primary Examiner*—Mark R. Powell
*Assistant Examiner*—Anil Khatri
(74) *Attorney, Agent, or Firm*—Wolff & Samson

(57) ABSTRACT

A system and method for determining calendric association rules are provided. The method uses calendars to describe the variation of association rules over time, where a specific calendar is defined as a collection of time intervals describing some phenomenon. In accordance with the invention, there is provided a method for identifying calendric association rules in transactional data with time stamped data items. In one exemplary embodiment, the method identifies large itemsets in each time unit, where a large itemset is an itemset that occurs in the transactions more than a given threshold. The method then identifies association rules of the form X—Y from the large itemsets by determining if a requisite support for the itemset XY and a given confidence threshold (ratio of (support of XY)/(support of X)) has been satisfied. Calendric association rules are then generated by examining identified association rules to determine which ones exhibit the temporal patterns specified by given calendars. In another embodiment, the method identifies large itemsets in each time unit, where an itemset includes at least one item type. The method then identifies calendars that belong to the large itemsets. Potential calendars for increasingly larger item type itemsets are generated by using previously identified calendars. Support values are calculated to determine which potential calendars actually belong to the itemsets and this is then used to determine what potential calendar association rules exist. The potential calendar association rule information and support values are used to determine which potential calendars actually belong to association rules.

25 Claims, 3 Drawing Sheets

OTHER PUBLICATIONS

Srikant et al, "Mining quantitaive association rules in large relational tables", ACM SIGMOD pp 1–12, Apr. 1996.*

Dunkel et al, "Data organization and access for efficeint data mining", pp 522–529 IEEE, Apr. 1999.*

Shen et al, "New algorithm for efficient mining of association rules" IEEE, pp 234–241, 1999.*

Wur et al, "An effective boolen algorith for mining association rules in large database", IEEE, pp 179–186, Jun. 1999.*

Han et al, "Mining multiple level association rules in large database", IEEE, pp 798–805, Apr. 1999.*

* cited by examiner

SYSTEM AND METHOD FOR DISCOVERING CALENDRIC ASSOCIATION RULES

FIELD OF THE INVENTION

The present invention relates to a system and associated methods for mining for user-defined patterns in association rules. More particularly, the invention discloses methods for analyzing transactional data to discover calendric association rules, which allow for interpretation of the data taking into account user-defined time periods.

BACKGROUND OF THE INVENTION

With the recent advances in computing technology, many businesses have begun to maintain detailed records of all aspects of business operation, particularly data concerning transactions. This data may be used, inter alia, to determine which products or services are moving well, which products or services should be discontinued, packaged together, sold at the same retail outlet, etc. It can be readily appreciated that thorough analysis of transaction data can be used by businesses to more effectively control and distribute inventory and create effective store displays. For example, if a retail store sells both beer and nuts, it would be helpful from a marketing standpoint to know if there was an association rule expressing the percentage of customers buying beer who also buy nuts. Specifically, an association rule captures the notion of a set of data items occurring together in transactions. For example, in a database of a retail store which sells beer and nuts an association rule might be of the form:

beer→nuts (support: 3%, confidence: 87%), which indicates that 3% of all transactions stored in the database and mined for association rules contain the data items beer and nuts and that 87% of the transactions that have the item beer also have the item nuts. The two percentage terms above are commonly referred to "support" and "confidence", respectively.

There are many prior art systems for generating association rules or "mining" data for association rules. However, these systems do not allow for the mining of association rules within user specified time intervals or calendars such as, "first day of the month", or "government paydays". Thus the variance of association rules over time given such a user defined calendar cannot be discovered using prior art methods. More specifically, the prior art methods handle the transaction data as one large segment and do not permit segmentation of the data so as to allow the above queries. For example, a user could not determine which part of the day the most transactions occurred with respect to beer and nuts. That is, analysis cannot be done of the data in finer time granularity may reveal that the association rule exists only in certain time intervals and does not occur in the remaining time intervals.

Accordingly, there is a need to provide a method for mining for association rules where there is a temporal component, specifically, a user defined calendar. Generating these calendric association rules allows the user to do a more detailed analysis of the transactions, and correspondingly provides the user with a more powerful tool with which to control business operations more efficiently.

SUMMARY OF THE INVENTION

The invention is a methodology for discovering association rules exhibiting temporal variations of interest to users. The method uses calendars to describe the variation of association rules over time, where a specific calendar is defined as a collection of time intervals describing some phenomenon. A calendar algebra is used by the method of the invention to permit the user to select or define interesting calendars or specifically, to describe complicated temporal phenomena of interest to the user. The supplied calendars are then processed by the method to determine which calendars hold for which association rules.

In accordance with the invention, there are provided methods for identifying calendric association rules in time-stamped transactional data. The transactional data in a preferred embodiment is assumed to be segmented by the user based on natural time units like hours, days, etc. An exemplary method for discovering calendric association rules first determines all the association rules in all the time units of the data. The method of the invention then analyzes the behavior exhibited by each such resulting association rule over time to discover whether the association rule exhibits any of the temporal behavior specified in any of the user-defined calendars.

Another exemplary method for discovering calendric association rules first determines the behavior of small itemsets (which are components that determine association rules) over the time units to discover the user-defined temporal patterns that the small itemsets exhibit. The method then uses this information to limit the amount of work that needs to be performed to determine the behavior of the larger itemsets. After discovering the behavior of all the relevant itemsets, this method then determines the association rules that exhibit the user-defined patterns or calendars.

DETAILED DESCRIPTION

1. Overview and Introduction

Figure 1:
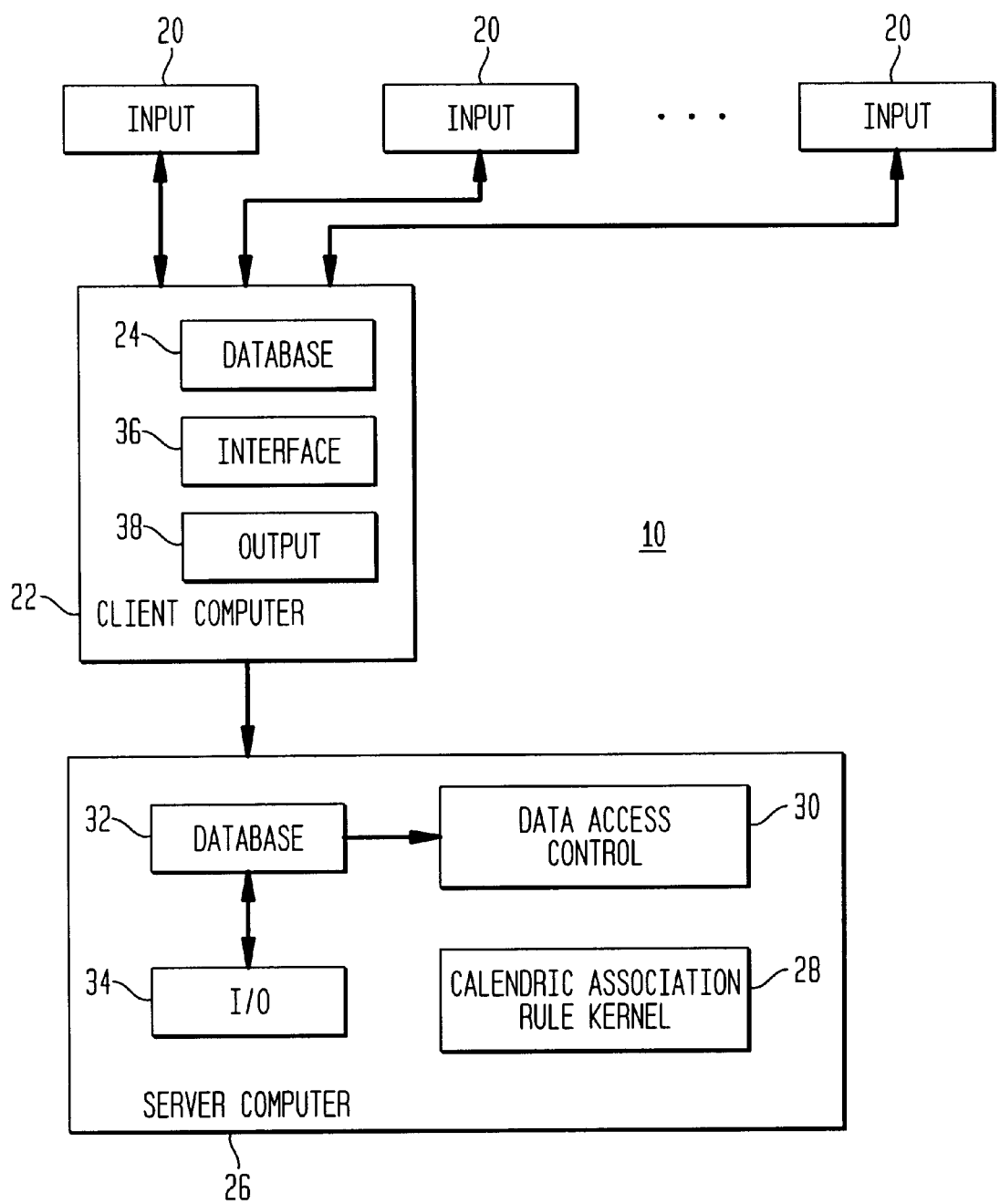
FIG. 1 is a functional block diagram of the system of the present invention.

FIG. 1 is a depiction of a system, generally indicated by the numeral 10, for generating transaction data which may be stored in a database. The system 10 also includes means for mining for association rules for the items stored in the database. In the particular architecture shown, several input terminals 20, which could be point of sale terminals, are used to generate time stamped data items for a particular user or client. Data gathered by the input terminals 20 are transmitted to a central computer 22, that is operated by the client. Central computer 22 contains a database 24 for storing the data items, as well as interface means for interfacing with a server computer 26, which may be a Unix or OS/2 server. A calendric association rule kernel (software kernel) 28 stored in the server computer 26 contains code for mining databases for association rules in accordance with the methods of the invention. The code may be executed by a processor within the server computer 26. Of course, the code may also be stored on a portable medium such as magnetic tape or disc. It is to be understood that architectures other than the one shown may be used.

In an illustrative embodiment of the invention, the method may be executed on a Sun Sparc 20 machine with 64 MB of memory. Through appropriate data access control 30 and other program utilities, the mining kernel 28 accesses one or more databases 32 which contain data concerning the transactions from which calendric association rules can be extracted. Once the rules are extracted or mined they may be sent to the client computer via input/output (I/O) module 34.

The client computer 22 contains a mining kernel interface 36 which functions as an input mechanism for certain variables such as calendar definition, minimum support value, etc. In a preferred embodiment of the invention, the mining kernel interface 36 will include a set of frequently used predefined calendars. The client computer 22 also includes an output device 38 such as a CRT, printer, or storage device such as a floppy disk.

Figure 2:
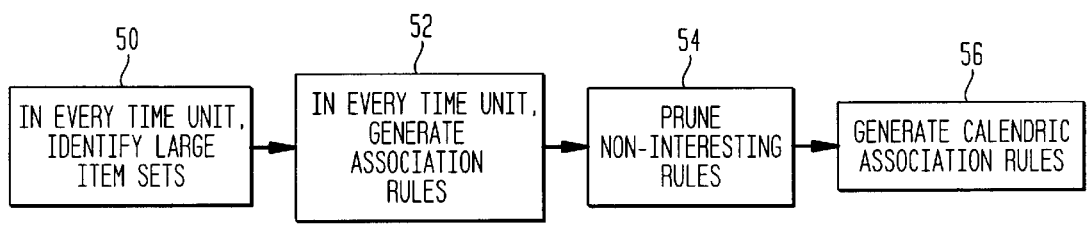
FIG. 2 shows the overall method of the present invention in accordance with a first embodiment called the sequential method.
Figure 3:
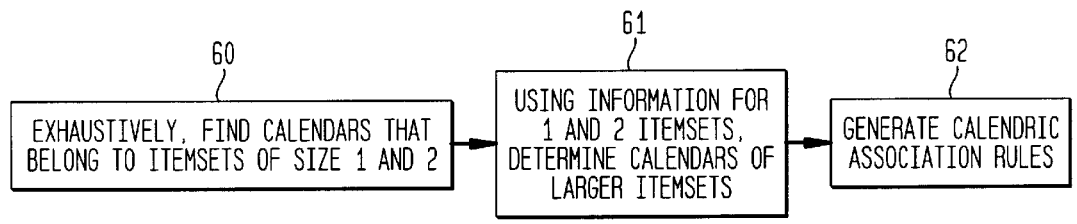
FIG. 3 shows the overall method of the present invention in accordance with an alternative embodiment called the interleaved method.
Figure 4:
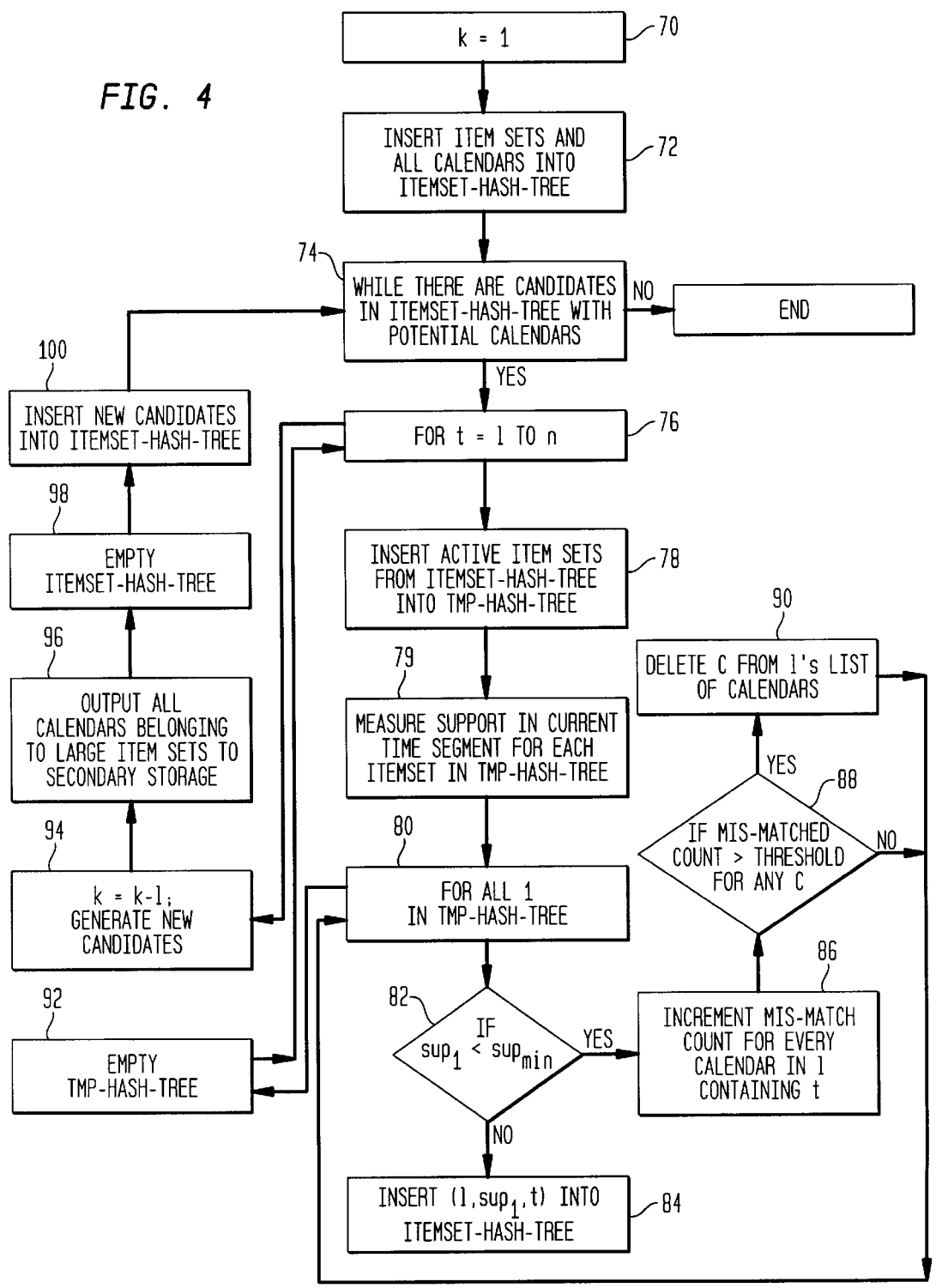
FIG. 4 is a flowchart illustrating the details of the method shown in FIG. 3.

FIGS. 2–4 illustrate the structure of instructions as embodied in a computer program in accordance with the method of the invention. The invention is practiced in its preferred embodiment by a machine component that presents the computer program code elements in a form that instructs a computer to perform a sequence of function steps corresponding to those shown in the Figures. The machine component may be a disc drive contained with the server computer 26.

FIG. 2 shows the overall method of the invention in accordance with a first embodiment. In a first block 50, large itemsets are identified for every time unit. Then the association rules are generated for every time unit in block 52. In block 54, the non-interesting rules are pruned. Then, in block 56 the calendric association rules are calculated. This method may be called a sequential method and is described below. It can be readily appreciated by those familiar with the art that blocks 50–54 are conventional. However, mining for calendric association rules requires the analysis of a temporal component which is not found in the prior art. The methods of including the temporal component in the analysis is an essential part of the method of the invention.

To illustrate, consider again the example of the association rule:

beer→nuts (support: 3%, confidence: 87%).

While this association rule provides useful information, it may be the case that beer and nuts are sold together primarily between 6 p.m. and 9 p.m. on week days, or, more specifically, that the user specified minimum support and confidence parameters are only met within those time intervals. Accordingly, it would be useful to have a tool for discerning association rules within user specified time intervals or calendars.

Automatic detection of all calendars that hold for association rules is not feasible since the number of calendars over a time period is exponential in the size of the time period. In order to deal with the problem, the invention proposes a calendar algebra which can be used to define interesting calendars. In accordance with a preferred embodiment of the invention, the user can also choose from a set of predefined calendars. Once the calendars have been selected, a determination can be made as to which calendars hold for which association rules. Of course, the data to be analyzed must be time stamped.

An association rule is considered to be calendric if the rule has the minimum confidence and support during every time unit contained in a calendar, modulo a mismatch threshold, which allows for a certain amount of error in the matching. This mismatch threshold models the fact that, in real life, the association rule will hold for most but not all of the time units in the calendar. The calendar is then said to belong to the rule. The rule need not hold for the entire transactional database, but rather only for transactional data during the time units specified by the calendar. It should be noted here that the transactional data base contains a set of items, a transaction ID and a time-stamp.

A set of data items may be denoted by the expression:

$$I=\{i_1, i_2, \ldots, i_N\}.$$

A transaction T is defined to be a subset of I. Similarly, an itemset is also defined to be a subset of I. The letters $X, Y, X_1, Y_1, \ldots$ are used to denote itemsets. If X and Y are itemsets, then XY represents the set union of X and Y. An association rule of the form X→Y is a relationship between the two disjoint itemsets X and Y. As has been previously mentioned, the support of an itemset X over the set of transactions T is the fraction of transactions that contain the itemset. An itemset is called large, if its support exceeds a given threshold $\sup_{min}$. The confidence of a rule X→Y over a set of transactions T is the fraction of transactions containing X that also contain Y. The association rule X→Y holds if XY is large and the confidence of the rule exceeds a given threshold $\text{con}_{min}$.

In accordance with the methods of the invention, the transaction model is enhanced with a time attribute that describes the time when the transaction was executed. In one embodiment, the user supplies the unit of time. For purposes of discussion, the $j^{th}$ time unit, where $j \geq 0$, is denoted by $t_j$. It corresponds to the time interval $[j \cdot t, (j+1) \cdot t]$, where t is the unit of time. The set of transactions executed in time unit $t_j$ may be represented by T[j]. The support of an itemset X in T[j] is the fraction of transactions in T[j] containing X and the confidence of the rule X→Y is the fraction of transactions in T[j] containing X that also contain Y. An association rule X→Y holds in time unit $t_j$, if the support of XY in T[j] exceeds $\sup_{min}$ and the confidence of X→Y exceeds $\text{con}_{min}$.

A calendar C is a set of (possibly interleaved) time intervals $\{(s_1, e_1), (s_2, e_2), \ldots, (s_k, e_k)\}$. C is said to contain time unit t if it contains an interval $(s_j, e_j)$ such that $s_j \leq t \leq e_j$. The mismatch threshold may be represented by m, which is an integer that limits the number of mismatches that can occur. A calendar belongs to an association rule X→Y if the rule has enough support and confidence for the time units contained in the calendar with at most m mis-matches. In other words, if the calendar contains w time units, the association rule has to hold for at least w-m of them. Similarly, the calendar is said to belong to an itemset X if the support of X exceeds $\sup_{min}$ in at least w-m time units. Of course, m may be selected by the client or user.

For example, let the unit of time be a day. Consider the calendar consisting of the days that national employment figures were announced by the U.S. government in 1996. The calendar corresponding to those days, assuming the days are numbered consecutively with day 1 being Jan. 1, 1996, is C={(31,31), (60,60), (89,89), (121,121), (152,152), (180,180), (213,213), (243,243), (274,274), (305,305), (334,334), (366,366)}. Assuming furthermore that the mismatch threshold is 0, if we have a transactional database of trades of stock made by people, we will say that calendar C belongs to the rule "Buying of QuickRich Software→Selling of PowerIsGood", if the rule has enough support and confidence on days 31,60,89,121,152,180,213,243,274,305,334, 366 of year 1996. If the mismatch threshold is 4 then the rule "Buying of QuickRich Software→Selling of PowerIsGood" has to hold for at least 12−4=8 of the 12 days in the calendar.

Given a set of transactions and a set of template calendars, the problem of discovering calendric association rules is defined as discovering relationships between the presence of items in the transactions that follow the patterns set forth in the calendars.

An association rule can be represented as a binary sequence where the 1's correspond to the time units in which the rule holds and the 0's correspond to the time units in which the rule does not have the minimum confidence or support For instance, if the binary sequence 001100010101 represents the association rule X→Y, then XY holds in T[3], T[4], [[8], T[10], and T[12]. The calendar {(4,4),(8,8),(12, 12)}, which corresponds to a cycle of length 4, belongs to the association rule since the association rule is valid on the 4th, 8th and 12th time units. Unlike variables in programming languages, calendars start from unit one. Similar to association rules, itemsets can also be represented as binary sequences where 1's correspond to time units in which the corresponding itemset is large and 0's correspond to time units in which the corresponding itemset does not have the minimum support

2. Description of Calendar Algebra

A calendar is defined as a structured collection of intervals. Let $s_1, s_2, \ldots, s_k, e_1, e_2, \ldots, e_k$ be integers. A collection $S=\{(s_1, e_1), (s_2, e_2), , (s_k, e_k)\}$ is defined as a calendar of order 1. A calendar of order 2 is a collection of calendars of order 1 and so on. In order to capture relationships between two intervals, the following interval operators may be used. The operators operate on two intervals (denoted by int1= $(s_1,e_1)$ and int2=$(s_2,e_2)$) and return a Boolean value.

int1 overlaps int2≡$((s_1 \leq s_2 \leq e_1) \lor (s_2 \leq s_1 \leq e_2))$ int1 during int2 ≡$((s_1 \geq s_2) \land (e_1 \leq e_2))$ int1 meets int2≡$(e_1=s_2)$ int1<int2≡$(e_1 \leq s_2)$ int1≤int2 $((s_1 \leq s_2) \land (e_1 \leq e_2))$ In order to define complicated temporal expressions such as, first days of the month, the method of the invention uses the above interval operators to define two operators of the calendar algebra, the dicing operators and the slicing operators.

For each interval operator, there are two dicing operators. The dicing operators work in two modes: (1) they can take an order 1 calendar as their left argument, an interval as their right argument and produce an order 1 calendar as their output, (2) they can take an order 1 calendar as their left argument, an order 1 calendar as their right argument and produce an order 2 calendar as their output. The dicing operators produce an order 1 calendar for each interval in their right argument.

For each interval operator R, there are two dicing operators: strict, denoted by :R:, and relaxed, denoted by .R. If C is an order 1 calendar and c' is an interval, then the two operators are defined as:

$C :R: c' \equiv \{c \cap c' | c \in C \land c R c'\}/\{\epsilon\}$ $C.R.c' \equiv \{c | c \in C \land c R c'\}/\{\epsilon\}$ The intersection between two intervals $(s_1, e_1)$ and $(s_2,e_2)$ is defined as $(\max(s_1, s_2), \min(e_1, e_2))$ and $\epsilon$ denotes the interval $(-\infty,\infty)$ that is to be excluded from the result. The definitions for operators that take a calendar as their right hand argument is similar (C' is an order 1 calendar.):

$C :R: C' \equiv \{\{c \cap c' | c \in C \land c R c'\}/\{\epsilon\} | c' \in C'\}$ $C.R.C' \equiv \{\{c | c \in C \land c R c'\}/\{\epsilon\} | c' \in C'\}$ As an example of how the dicing operator may be used to allow a user to define and manipulate calendars, let WeeksInJan96 denote the calendar {(−3,4), (5,11), (12,18), (19,25), (26,32)}. Let JanIn1996 denote the calendar {(1, 31)}. The expression WeeksInJan96: overlaps: JanIn1996, which uses the strict operator returns a single order 2 calendar {{(1, 4), (5,11), (12,18), (19,25), (26,31)}}. Because of the intersection with the interval from the right hand side, the result consists of only the portion of the weeks that fall in the interval (1,31). The expression WeeksInJan96.overlaps.MonthsIn1996, which uses the relaxed operator, returns the calendar {{(−3,4),(5,11),(12, 18),(19,25),(26,32)}}. In this case, every week that overlaps with (1,31) is returned in its entirety.

The slicing operators work as follows. Let C be a calendar and p an integer. Two slicing operators denoted by (p)/C and [p]/C operate on C and replace each of the order 1 collections contained in C with the result of the slicing operation. The operator (p)/C replaces each order 1 calendar in C with its pth element and returns the result. For example, while operating on an order 1 calendar,(p)/C simply returns the pth interval in C. The operator [p]/C replaces every order 1 calendar with a calendar consisting of the pth element. For example, while operating on an order 1 calendar, [p]/C returns a calendar consisting of the pth element. If p is negative, indexing is done from the end of the calendar. For example, (−1)/C returns the last element of C. Finally, instead of a single integer p, one is allowed to specify a list of integers for the slicing operation. $[p_1,p_2, \ldots ,p_k]/C$ replaces each order 1 calendar with a calendar consisting of the $p_1^{th}, p_2^{th},$ etc. elements while$(p_1,p_2, \ldots , p_k)/C$ replaces each order 1 calendar with the $p_1^{th}, p_2^{th},$ etc. elements.

In addition to the operations defined above, the minus (−) and the plus (+) may be used with their usual set-theoretic meanings on calendars. A flatten operator is also used which takes an order k calendar and produces an order k−1 calendar which is a single calendar made of the all elements of the constituent order (k−1) calendars.

As an example of the slicing operator, let WeeksInJan96 denote the calendar {(−3,4), (5,11), (12,18), (19,25), (26, 32)}. The expression [3]/WeeksIn Jan96 returns the calendar {(12,18)}. The expression [−2]/WeeksInJan96 returns the calendar {(19,25)}, while the expression [3, 4]/WeeksInJan96 returns the calendar {(12,18), (19,25)}.

The expression flatten{{(−3, 4), (5,11), (12,18), (19,25), (26,32)}} returns {(−3,4), (5,11), (12,18), (19,25), (26,32)}, while the expression flatten{{(1, 1)}, {(5,5)}} returns {(1,1), (5,5)}.

The operators introduced thus far simply operate on calendars. In order to be able to define real-life calendar expressions, one needs a calendric system like the Gregorian calendar system. The Gregorian calendar system may be effectively utilized in accordance with the present invention by defining what are called basic calendars. They are SECONDS, MINUTES, HOURS, DAYS, WEEKS, MONTHS, YEARS, DECADES, and CENTURY, and refer to the corresponding familiar temporal concepts. In addition, a reference point in time called the origin of the calendric system is defined. For the purposes of the illustrative embodiment, the origin is the UNIX system start data, Jan. 1, 1970 and this is taken to be the starting point for all the basic calendars.

Relationships between basic calendars are kept in a table with the following structure: CALTABLE(cal1: string, cal2: string, repList: array of integers, offset: integer).

In CALTABLE, cal1 and cal2 are one of the basic calendars. For example, an entry {YEARS, MONTHS, 12, 0} expresses the relationship that each year is made up of 12 months. To express something more complicated like the relationship between years and days, an entry of the form {YEARS, DAYS, (365, 365, 366, 365), 0} is used. This means that the first year from the origin (1970) has 365 days, and that the second year from the origin also has 365 days. The third year, being a leap year, has 366 days. The fourth year has 365 days. After this, the pattern repeats over.

As alluded to before, all calendric systems are indexed from 1, rather than 0. Also, an interval over time is assumed to never contain 0. For example, the interval (−3, 1) contains the time units −3, −2, −1, and 1, but not 0. Obviously, this doesn't handle leap centuries. To handle this, a more complicated expression is needed. The "offset" is used to take care of the basic calendars whose boundaries do not match with the chosen origin. Thus an entry of the form {WEEKS, DAYS, 7, 4} is used to take into consideration the fact that Jan. 1, 1970 lies on a Thursday (assuming that a week begins on a Monday).

One should note at this point that there are other ways to define and implement basic calendars. The calendar algebra defined here can work on top of any system that defines and implements basic calendars. Once the relationships between the basic calendars are defined, complex temporal expressions may be advantageously defined and employed by one practicing the invention to facilitate a thorough analysis of a time stamped transactional database.

For example, Mondays that overlap the first day of a month are expressed by the calendar algebra expression:

```
flatten(((1)/(DAYS :during: WEEKS))
        :during:
        ((1)/ (DAYS :during: MONTHS)))
```

The (DAYS:during: WEEKS) expression expresses weeks in terms of its constituent days. The (1)/(DAYS :during: WEEKS) then selects the first day of every week, producing a calendar consisting of the first day of every week. Similarly, the expression (1)/(DAYS :during: MONTHS) returns a calendar consisting of the first day of every month. The "during" between these calendars returns an order two calendar consisting of the Mondays that occur during the first days of the months. The flatten reduces this to an order 1 calendar containing the result.

Let us assume in another example that equity options expire on the 3rd, 6th, 8th and 11th month of a year. The equity option expiration date on an option expiration month is defined to be the third Friday of the month. If the third Friday is a holiday, the expiration date is the preceding working day. The algebra expression for this is as follows (Temporary variables have been added to make the expression easy to understand.):

```
Expiration Months = (3,6,8,11)/MONTHS :during: YEARS)
Fridays = (5)/(DAYS :during: WEEKS)
temp1 = (3)/(Fridays :during: ExpirationMonths)
temp2 = (temp1 :overlaps: HOLIDAYS)
Result = temp1 − temp2 + ((−1)/((DAYS − HOLIDAYS) :<: temp2))
```

The calendar ExpirationMonths contains the $3^{rd}$, $6^{th}$, $8^{th}$, $11^{th}$ and 11th month of each year. The calendar Fridays contains the $5^{th}$ day of every week. temp1 then consists of the $3^{rd}$ Fridays of the expiration months. temp2 consists of those Fridays that are holidays. Finally, the expression, (DAYS−HOLIDAYS) :<: temp2)) associates, for each day in temp2, all of the working days that precede it. Doing a (−1) slice on this expression selects the working day preceding a day in temp2. The result consists of temp1 with those days in temp2 replaced by the preceding working day.

In order to more efficiently process the calendar algebra, a parser and an evaluator may be advantageously employed. The parser may be an LALR parser as described in Rakesh Chandra, Arie Segev and Michael Stonebreaker, "Implementing Calendars and Temporal Rules in Next Generation Databases", *Proceedings of the Tenth International Conference on Data Engineering,* pages 264–273, Houston, Tex., February 1994. Starting and ending points and the granularity for the output calendar are supplied by the user or when possible, deduced from the algebra expression. The result of the evaluation is an order 1 calendar (i.e., a collection of intervals), which is then passed to the data mining routines.

3. Discovering Calendric Association Rules a. Sequential Method

Referring again to FIG. 2 a method for mining a transactional database for calendric association rules in accordance with a first embodiment is shown. This approach to discovering calendric association rules treats the problem of calendar detection and association rule mining separately. The rules in each time unit are generated with one of the existing methods as shown in blocks 50–54 (See R. Agrawal and R. Srikant, "Fast Algorithms for Mining Association Rules in Large Databases", *Proceedings of the 20th International Conference on Very Large Data Bases,* pages 487–499, Santiago, Chile, September 1994, and A. Savarese, E. Omiecinski, and S. Navathe, "An Efficient Algorithm for Mining Association Rules in Large Databases", *Proceedings of the 21st Century International Conference on Very Large Data Bases,* pages 432–444, Zurich, Switzerland, September 1995, both of which are herein incorporated by reference) and then a pattern matching technique, as discussed below, is employed to discover calendars. This approach is called the sequential method.

As has been previously noted, existing methods discover association rules in two steps. In the first step, large itemsets are generated. In the second step, association rules are generated from the large itemsets. The running time for generating large itemsets can be substantial, since calculating the supports of itemsets and detecting all the large itemsets for each time unit grows exponentially in the size of the large itemsets. To reduce the search space for the large itemsets, the existing methods exploit the following property: "Any superset of a small itemset must also be small."

The existing methods calculate support for itemsets iteratively and prune all the supersets of a small itemset during the consecutive iterations. This pruning technique is referred to as support-pruning. In general, these techniques execute a variant of the following steps in the kth iteration:

1. The set of candidate k-itemsets is generated by extending the large (k−1)-itemsets discovered in the previous iteration (support-pruning).
2. Supports for the candidate k-itemsets are determined by scanning the database.
3. The candidate k-itemsets that do not have minimum support are discarded and the remaining ones constitute the large k-itemsets.

The idea is to discard most of the small k-itemsets during the support-pruning step so that the database is searched only for a small set of candidates for large k-itemsets.

In the second step, the rules that exceed the confidence threshold $con_{min}$ are constructed from the large itemsets generated in the first step with one of the existing techniques, for example, see Agarwal mentioned above. Once the rules of all the time units have been discovered, calendars that belong to the rules need to be detected. Let r be the number of rules detected and k be the number of tine units a calendar contains. Checking to see whether the calendar belongs to the rules can be done in time O(r*k).

However, in practice, it turns out that the number of association rules is substantially more than the number of large itemsets discovered. This typically causes the sequential method to run out of real memory causing it to perform many I/O operations to bring relevant portions of the data into memory. In particular, as the average itemset size increases, this becomes a severe problem for the sequential method. In another embodiment, large itemsets are discovered over all the time units. The above techniques are then used to discover the association rules and their associated calendars. This speeds up the sequential method substantially.

b. Interleaved Method

There are three optimization techniques which may be used to reduce the number of itemsets for which support must be calculated and can be applied for the discovering of calendric association rules. These techniques, pruning, skipping, and elimination, rely on the following fact: "A calendar that belongs to the rule X→Y also belongs to the itemset XY." Therefore, eliminating calendars as early as possible can substantially reduce the running time of calendric association rule detection.

Skipping is a technique for avoiding counting the support of an itemset in time units which are unlikely to be contained in any calendar that can belong to the itemset. Skipping is based on the following property: "If time unit $t_j$ is not contained in any calendar that belongs to an itemset X, then there is no need to calculate the support for X in time segment T[j]."

However, this technique can be applied only if information about the calendars of an itemset X are already available. But the calendars of an itemset X can be computed exactly only after we compute the support of X in all the time segments. In order to avoid this self-dependency, the calendars of itemsets must be approximated. To do this, one of the optimization techniques, pruning, may be employed. Pruning is based on the idea that if a calendar C belongs to an itemset X, then it must also belong to all of X's subsets.

This is illustrated by letting k be the number of time units belonging to C, and by letting m be the mis-match threshold. Since C belongs to itemset X, it must be the case that support for X exceeds $sup_{min}$ for at least k-m of the k units contained in C. However, if Y is a subset of X, then the support for Y has to be more than the support for X for any time unit. This implies that Y's support exceeds $sup_{min}$ for at least k-m of the k time units contained in C.

Therefore, one can arrive at an upper bound on the calendars that belong to an itemset X by looking at the calendars that belong to X's subsets. By doing so, the number of potential calendars that belong to X may be reduced, which, in turn (due to skipping), reduces the number of time units in which one needs to calculate support for X. Thus, pruning is a technique for computing the potential calendars of an itemset by merging the calendars of the itemset's subsets.

However, it is possible in some cases that the potential calendars of an itemset cannot be computed, for example, when one is dealing with singleton itemsets. In these cases, an assumption is made that an itemset X has every possible calendar and therefore, calculate the support for X in each time segment T[j] (except the time units eliminated via support-pruning). This is, in fact, what the sequential method does.

As an example consider the following situation. If it is known that the calendar {(4, 4), (8, 8), (12,12)} is the only calendar that belongs to items A and B, then pruning implies that the only calendar that can belong to AB is also {(4, 4), (8, 8), (12, 12)}. In turn, skipping implies that one has to calculate the support of AB only in T[4],T[8], and T[12] rather than all the time segments.

The third optimization technique, elimination, can be used to further reduce the number of potential calendars of an itemset X. Elimination is used to eliminate certain calendars from further consideration once one has determined they cannot exist. Elimination relies on the following premise: If the support for an itemset X is below the minimum support threshold $sup_{min}$ in m time units contained in a calendar C, where m is the mis-match threshold, then C cannot belong to X. Elimination enables the discarding of calendars that an itemset X cannot have as soon as possible. As an example, if the mis-match threshold is 0, and it is discovered that itemset X does not have enough support in T[4], then the calendar {(4,4), (8,8), (12,12)} cannot belong to X.

The pruning, skipping and elimination techniques lead to the interleaved method for discovering calendric association rules. The thesis for the interleaved method is that the calendars associated with itemsets can be used to minimize the number of candidates whose support we need to count. Furthermore, the number of potential calendars that need to be associated with itemsets can also be minimized.

The interleaved method consists of two phases as is shown in FIG. 3 and in Table 1. In the first phase, the calendars belonging to large itemsets are discovered in blocks 60 and 61. In the second phase, calendric association rules are generated as shown in block 62.

In the first phase of the interleaved method, the search space for the large itemsets is reduced using pruning, skipping and elimination. Note that at the end of the first phase, the set of calendars that actually belong to itemsets of size k are known.

Phase One terminates when the list of potential calendars for each k-itemset is empty. Pruning, skipping and elimination can reduce the candidate k-itemsets for which support will be counted in the database substantially, and therefore can reduce the time needed to calculate large itemsets.

As an example consider the following. Suppose that the only calendar of interest is C={(4, 4), (8,8), (12,12)} and sequences 1110000000111111111 and 1111010111111111111 represent items A and B, respectively. It is noted again that a 1 in such a sequence indicates that the item has enough support and that a 0 indicates that it doesn't. Assume also that the mis-match threshold is 0.

TABLE 1

Phase One for Interleaved Method

/*This method uses two hash-trees. itemset-hash-tree contains candidates of size k, their potential calendars, and space to store support counts for the relevant time units. If a calendar contains time unit t and belongs (or potentially can belong) to an itemset, that itemset is said to be "active" at time unit t. tmp-hash-tree, during the processing of time segment t, contains all the itemsets that are active in t./
    initially, itemset-hash-tree contains singleton itemsets and all possible calendars
    k=1
    while (there are still candidates in itemset-hash-tree with potential calendars)
    for t=1 to u TABLE 1-continued Phase One for Interleaved Method

```
    insert "active" itemsets from itemset-hash-tree into tmp-hash-
    tree / /skipping measure support in current time segment for
    each itemset in tmp-hash-tree
    forall 1 ∈tmp-hash-tree
        if (sup₁ < sup_min)
        then
            increment mis-match count for every calendar
            potentially) belonging to 1 that contained t.0
            if mis-match count exceeds threshold for a
            particular calendar C, delete it from 1's list
            of potential calendars / / elimination
        else insert (1, sup₁,, t) into itemset-hash-tree
            / / this just inserts a (sup₁, time) entry in one of
            itemset 1's fields
        end forall
        empty tmp-hash-tree
    endfor
    generate new candidates of size k+1 using pruning
    k = k + 1
    empty itemset-hash-tree after copying it
    insert new candidates into itemset-hash-tree
endwhile
```

If the sequential method is used, then support for A and B will be calculated in all the time segments, and support for AB will be calculated in time segments 1–3, and 11–19. In the interleaved method, support for A will be calculated only in time unit 4, at which point C is eliminated from consideration for A. Support for B is calculated in time segments 4,8, and 12 and C is found to belong to B. The itemset AB has no potential calendars because A has none and hence support for AB is never calculated.

In the second phase of the interleaved method, calendric association rules can be calculated using the calendars and the supports of the itemsets without scanning the database. Interleaving calendar detection with large itemset detection also reduces the overhead of the rule generation phase. This is because a calendar of the rule X→Y must belong to the itemset XY, and at the end of the first phase of the interleaved method we already know the calendars of large itemsets. Thus, the set of candidate calendars for a rule X→Y initially consists of the set of calendars of the itemset XY. As a result, one needs to calculate the confidence of a rule X→Y only for time units that are contained in the calendars belonging to XY. Moreover, one can apply elimination here also. If C is a calendar belonging to XY, and one encounters m time units in which X→Y does not have minimum confidence or XY doesn't have enough support, one can eliminate C from the list of potential calendars for X→Y.

A detailed embodiment of Phase One of the interleaved method of the present invention is described with respect to FIG. 4 and Table 2. The interleaved method uses a pair of hash-tree data structures, (which are described in R. Agarwal, R. Srikant, "Fast Algorithms for Mining Association Rules in Large Databases", *Proc. of the 20th International Conference on Very Large Databases,* page 487–499, Santiago, Chile, September 1994 and incorporated here by reference) itemset-hash-tree and tmp-hash-tree to store large itemsets, their patterns and support counts. The hash tree tmp-hash-tree is used during the processing of an individual time segment. Candidate generation (generation of itemsets of size k+1 and their candidate cycles from itemsets of size k) is based on pruning. If a calendar contains time unit t and belongs, or potentially belongs to an itemset, that itemset is said to be active at time unit t. The hash tree tmp-hash-tree contains, during the processing of time segment t, all the itemsets that are active in t.

The interleaved methods consist of two major loops of code. The outer loop iterates over the size of the itemsets, starting with itemsets of size 1 and finding larger and larger itemsets. For each value of itemset size, the inner loop iterates over all the time units in the database. In the inner loop, all the actual calendars that belong to itemsets of a particular size are determined. The outer loop terminates when there are no more candidate itemsets (itemsets with calendars that potentially belong to them).

The process starts with singleton itemsets (hence, k=1) as shown in blocks 70 and 72 of FIG. 4. All calendars are assumed to potentially belong to all the singleton itemsets. For other values of k, calendars that potentially belong to itemsets are determined using pruning (block 94). Candidate itemsets are stored in the hash-tree itemset-hash-tree, for speedy access.

The beginning of the outer-loop includes a test, in block 74, to terminate the first phase of the rule mining process when there are no more candidates. The inner loop, which iterates over the time segments of data (block 76), determines which calendars actually belong to the candidates. In order to minimize work during a time segment "t", it considers only active itemsets for counting support (block 78). Such active itemsets are identified in itemset-hash-tree and inserted into the hash-tree tmp-hash-tree. The relevant segment is then scanned to determine whether the active itemsets have enough support, in block 79.

If an itemset was active during a time "t" and it didn't have enough support in the corresponding segment, it implies a mis-match in the corresponding calendars. This determination is made for each itemset in tmp-hash-tree in blocks 80 and 82. Mis-match counts are updated in block 86. If the mis-match count for a calendar that potentially belongs to an itemset exceeds a predetermined or user supplied mis-match threshold, the calendar is deleted from the itemset's list of potential calendars in blocks 88 and 90. If, on the other hand, the itemset is supported, this fact is recorded in itemset-hash-tree in block 84. After the processing of each time segment, tmp-hash-tree is emptied and the next segment is processed (block 92).

After all the time-segments are processed, all the actual calendars that belong to an itemset have been correctly determined. (These are the calendars that have not been eliminated in block 90.) Using this information, itemsets of size k+1 are generated using pruning in block 94. Block 96 then outputs the information generated in the current round to storage. Hash tree itemset-hash-tree is emptied in step 98 and loaded with the new candidates in block 100 and the outer loop is continued.

c. Calendar Detection

In order to detect whether a calendar C belongs to an association rule, the support and confidence of the rule must be examined for every time unit contained in the calendar. If the calendar contains k time units, this can be done in O(k) steps. And in general, this is the best that can be done since a calendar can contain arbitrary time units.

It should be noted here that skipping does not affect the detection of calendars. This can be shown by considering the following lemma: "In the course of determining whether a calendar C belongs to an association rule (itemset), suppose that C does not contain time unit t. Whether C belongs to the rule (itemset) or not is unaffected by the support and confidence (support) of the association rule (itemset) in time unit t." This follows from the definition of belongs that states that a calendar belongs to a rule (itemset) if the rule has enough support and confidence (support) for every time unit that is contained in the calendar (modulo the mis-match threshold). The support and confidence (support) of a rule (itemset) in a time unit t not belonging to the calendar, then clearly does not affect the determination process.

d. Multiple Granularities

The methodology of the invention is directly applicable even when handling multiple time granularities, so long as the different granularities are expressed in terms of a common time unit. That is, multiple time units are seamlessly integratable into the discussed methods since calendars over the multiple time units are expressible in terms of a common time unit that is guaranteed to exist. For example, calendars over months and weeks are expressible in terms of days. Once this is done, the sequential method can run a copy of itself for each granularity simultaneously (to avoid multiple scans of data). The interleaved method, as shown in Table 2, can keep track of itemsets and their calendars of different granularities easily. A key observation is that multiple granularities can be expressed as exact multiples of a lower granularity. Note that in Table 2, the inner for (for t=1 to $\mu$) loop iterates over the lower granularity.

TABLE 2

Modified Interleaved Method

```
/*This method uses two hash-trees. itemset-hash-tree contains candidates
of size k, their potential calendars, and space to store support counts for
the relevant time units. If a calendar contains time unit t and belongs (or
potentially can belong) to an itemset, that itemset is said to be "active" at
time unit t. tmp-hash-tree, during the processing of time segment t,
contains all the itemsets that are active in t./
    initially, itemset-hash-tree contains singleton itemsets and all possible
    calendars
    k=1
    while (there are still candidates in itemset-hash-tree with potential
    calendars)
    for t=1 to u
        for (each time granularity G used in calendars)
        if t is the beginning of a time unit in granularity G
            insert "active" itemsets from itemset-hash-tree that
            contain calendars of granularity G /* for example, if
            an itemset has a weekly calendar, then it will be
            inserted into tmp-hash-tree at the beginning of every
            week that the itemset is active */
    measure support in current time segment for
    forall 1 ϵtmp-hash-tree
        if (1's granularity is G, and t is the end of a time unit of
        granularity G) then
            if (support for 1 in current unit of granularity G <
            sup_min) then
                increment mis-match count for every
                calendar (potentially) belonging to
                1 that contains the current
                granularity unit.
            if mis-match count exceeds threshold for a
            particular calendar C, delete it from
            1's list of potential calendars //
            elimination
        else insert (1, sup_1,, G, t) into itemset-hash-tree
        delete 1 from tmp-hash-tree
    end forall
        empty tmp-hash-tree
    endfor
    generate new candidates of size k+1 using pruning
    k = k + 1
    empty itemset-hash-tree after copying it
    insert new candidates into itemset-hash-tree
endwhile
```

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A method for identifying calendric association rules in transactions with time-stamped data items, comprising the steps of:

identifying a plurality of time intervals as constituting a calendar of interest;

identifying large itemsets in each time interval, where a large itemset is an itemset that occurs in the transactions at least as frequently as a preselected support threshold;

identifying association rules from said large itemsets by determining if said preselected support and a confidence threshold has been satisfied; and generating calendric association rules by examining identified association rules to determine which ones exhibit temporal patterns as specified by a given calendar.

2. The method according to claim 1, wherein said association rules are of the form X→Y.

3. The method according to claim 2, wherein said preselected support is for a XY itemset.

4. The method according to claim 3, wherein said given confidence threshold is a ratio of support of Itemset XY over support of Itemset X.

5. The method according to claim 1, wherein said confidence threshold is a user defined variable.

6. The method according to claim 1, wherein said preselected support is a user defined variable.

7. The method according to claim 1, wherein said given calendars are user defined.

8. The method according to claim 1, wherein said given calendars are selected by a user from a list of calendars.

9. The method according to claim 1, wherein said given calendars are selected by a user using calendar algebra to define interesting calendars.

10. The method according to claim 1, further including the steps of:

using said large itemsets and said preselected support to ascertain which calendars actually belong to said large itemsets;

using ascertained calendars to determine what potential calendar association rules exist; and using potential calendar association rule information and computed support values to determine which of said calendars actually belong to association rules.

11. A method for identifying calendric association rules in transactions with time-stamped data items, comprising the steps of:

identifying a plurality of time intervals as constituting a calendar of interest;

identifying large itemsets in each time interval, where a large itemset is an itemset that occurs in the transactions at least as frequently as a preselected support threshold and an itemset includes at least one item type;

identifying calendars that belong to said large itemsets;

generating potential calendars for itemsets including additional item types by using previously identified itemsets and their calendars;

computing support for said itemsets in each time unit to determine which of said potential calendars actually belong to said itemsets;

using said itemsets and associated potential calendars to determine what potential calendric association rules exist; and using potential calendar association rule information and computed support values to determine which of said potential calendars actually belong to association rules.

12. The method according to claim 11, wherein a calendar is said to belong to said itemset if said itemset is large during every time unit contained in said calendar.

13. The method according to claim 11, wherein said step of generating increases by one the number of item types in each itemset.

14. The method according to claim 11, further including the step of restricting itemsets and time units for whom support has to be computed by using said potential calendars.

15. The method according to claim 11, further including the step of eliminating potential calendars from consideration if it is determined during support calculation that a potential calendar cannot belong to a certain itemset.

16. A system for identifying calendric association rules from transaction data having time-stamped items, comprising:

a computing device including memory for storing said transaction data;

said computing device operable to identify a plurality of time intervals as constituting a calendar of interest;

said computing device further operable to identify large itemsets in each time unit, where a large itemset is an itemset that occurs in the transactions at least as frequently as a preselected threshold;

said computing device further operable to identify association rules from said large itemsets by determining if a preselected support and a confidence threshold has been satisfied; and said computing device further operable to generate calendric association rules by examining identified association rules to determine which ones exhibit temporal patterns as specified by given calendars.

17. The system according to claim 16, wherein:

said association rules are of the form $X \rightarrow Y$;

said preselected support is for a XY itemset; and said confidence threshold is a ratio of support of Itemset XY over support of Itemset X.

18. The system according to claim 16, further including an interface for identifying said given calendars from a plurality of predefined calendars.

19. The system according to claim 18, wherein said interface is further operable to input a value for said confidence threshold and said preselected threshold.

20. The system according to claim 16, further including an interface for using calendar algebra to define interesting calendars as said given calendars.

21. The system according to claim 16, wherein:

said computing device is further operable to use said large itemsets and said preselected support to ascertain which calendars actually belong to said large itemsets;

said computing device is further operable to use ascertained calendars to determine what potential calendar association rules exist; and said computing device is further operable to use potential calendar association rule information and computed support values to determine which of said calendars actually belong to association rules.

22. A system for identifying calendric association rules in transactional data with time-stamped data items, comprising:

a processor having a memory, said memory storing said transactional data;

said processor operable to identify a plurality of time intervals as constituting a calendar of interest;

said processor further operable to identify large itemsets in each time unit, where a large itemset is an itemset that occurs in the transactions at least as frequently as a preselected support threshold and an itemset includes at least one item type;

said processor further operable to identify calendars that belong to said large itemsets;

said processor further operable to generate potential calendars for increasingly larger item type itemsets by using previously identified calendars;

said processor further operable to compute support for said itemsets in each time unit to determine which of said potential calendars actually belong to said itemsets;

said processor further operable to use said itemsets and associated potential calendars to determine what potential calendar association rules exist; and said processor further operable to use potential calendric association rule information and computed support values to determine which of said potential calendars actually belong to association rules.

23. The system according to claim 22, wherein a calendar is said to belong to said itemset if said itemset is large during every time unit contained in said calendar.

24. The system according to claim 22, wherein said processor is further operable to restrict itemsets and time units for whom support has to be computed by using said potential calendars.

25. The system according to claim 22, wherein said processor is further operable to eliminate potential calendars from consideration if it is determined during support calculation that a potential calendar cannot belong to a certain itemset.

* * * * *